Sept. 3, 1935.    O. SERAFINOWICZ    2,013,635
FLOATING, BATHING AND SWIMMING DEVICE
Original Filed July 15, 1931    6 Sheets-Sheet 1

Inventor:

Sept. 3, 1935.   O. SERAFINOWICZ   2,013,635
FLOATING, BATHING AND SWIMMING DEVICE
Original Filed July 15, 1931   6 Sheets-Sheet 2

Inventor:

Sept. 3, 1935.   O. SERAFINOWICZ   2,013,635
FLOATING, BATHING AND SWIMMING DEVICE
Original Filed July 15, 1931   6 Sheets-Sheet 3

Inventor:

Sept. 3, 1935. O. SERAFINOWICZ 2,013,635
FLOATING, BATHING AND SWIMMING DEVICE
Original Filed July 15, 1931 6 Sheets-Sheet 4

Inventor:

Sept. 3, 1935. O. SERAFINOWICZ 2,013,635
FLOATING, BATHING AND SWIMMING DEVICE
Original Filed July 15, 1931 6 Sheets-Sheet 6

Inventor:

Patented Sept. 3, 1935

2,013,635

UNITED STATES PATENT OFFICE 2,013,635

FLOATING, BATHING, AND SWIMMING DEVICE

Oscar Serafinowicz, Berlin, Germany

Application July 15, 1931, Serial No. 550,942. Renewed February 6, 1935. In Germany September 7, 1928

15 Claims. (Cl. 4—171)

The present invention relates to a floating bathing space comprising one or several sections and making it possible for people to enjoy bathing and swimming at any desired point in open waters, such as the sea and rivers or the like.

The floating bathing space according to the invention consists of one or several floating bodies with which one or several box-like or otherwise shaped surrounding surfaces permitting the water to flow through them in any direction are connected to facilitate swimming, bathing, sitting and lying in water, the connection being made so that the bath when inserted in open waters affords complete protection to users against accidents which happen so frequently in other baths as well as against attacks by fishes of prey or the like. The sides and bottom surfaces of the bath may be non-adjustable, or the bath container or the floating bodies or both may consist of single parts that can be readily assembled, in order to insure easy assembling and disassembling of the bath, or the floating bodies and the bath container may be of rigid or non-rigid construction. The many uses to which the invention is susceptible include, for example, the arrangement of connected or separate floating bathing spaces of any size around a stationary or moving vessel, around a stationary or floating recreation or refreshment center specially provided in open waters, around an open air bath or the like, so that a floating sea-bath of largest dimensions may be provided if desired. The floating bathing space may be connected directly in a rigid or non-rigid manner, or indirectly, with a floating or stationary support or float freely in the water. For moving the bath, sails, oars or motors may be employed or, if a smaller bath container is concerned, the bather may move himself and the container without any foreign aid.

The surrounding surfaces of the bath container or containers proper consist of net-work, wicker-work, lath-work or other suitable materials, such as wood or metal or the like, and the bottoms may be made of the same material or one which possesses greater strength. The constructional parts can be chosen so that the bottom surface has hardly any buoyancy, or none at all, and the floating bodies are not appreciably loaded.

The floating bodies carrying the bath container consist of known yielding or non-yielding substances which are capable of floating and impermeable to water, or of inflatable hollow bodies of suitable material and filled with air or gas.

By suitable supporting means the depth of the bottom of the inserted bath container or containers may be varied to permit, for example, the simultaneous bathing of adults and children. To vary the depth of the container or containers gradually or stepwise, braces or similar members differing in length may be provided in one or several sections of the container or containers, or suspended supports of equal or different length and different elasticity, rubber-covered or ordinary spiral springs, hollow bars with oil dash-pots and the like may be used for the same purpose. These supporting means afford the added advantage that the bottom surface assumes its highest position when in a position of rest and is gradually pressed down only by the weight of the person standing or sitting in the bath container, and will rise gradually again when the bather leaves the bottom surface and carries out swimming motions. In this way greatest possible safety is insured to learners or non-swimmers, as the bottom of the container can always be arranged at such a level and the elasticity of the suspended supports chosen so that the bather has sufficient water for swimming or other purposes at his disposal and go through the swimming motions without the least danger, no matter whether he lies or sits on the bottom of the container or swims. Furthermore, the depth of the bath container or containers may be varied also by suspending, for instance, the bottom surface of the container or containers at different heights before or during use, or by providing intermediate bottoms, or by arranging separate small containers within the main container.

To increase or reduce the floating capacity of the bath container or containers and the depth of the bottom surface, differently shaped floating bodies having, for example, a circular, spherical, oval, hexagonal, rectangular, square or similar form are placed with their narrow or broad sides on the surface of the water and grouped so as to attain the desired floating capacity of the bath container and depth of bottom, it being possible of course to use these means in connection with some of the means described above.

In case of floating bathing spaces not absolutely independent of supports but controlled from the shore or banks or a vessel or similar support it is often advisable to suspend the entire baths from one or several supporting frames projecting from the supports at the desirable or variable height, the frames acting as supplementary or sole support of the baths and having various shapes including that of a simple cross bar, such as the cross bar of a main sail or, in lighter constructions, a boat-hook or similar part. The points where the supporting frames or cross bars touch the deck, the edge of the board or the like of a vessel are chosen so that no dangerous tilting moment is imparted to the vessel when the bathing space or spaces are suspended from the frames or bars which may be provided also with sliding or folding counterweights, or with both, or with similar means, or compensations as to weight may be effected hydraulically. The supporting frames or bars may be supported at their projecting ends by additional floats or diagonal ties or cords or similar means or, simultaneously, by several of these means, and this supplementary supporting of the frames or bars by means of floats, diagonal ties or cords, or similar means may be carried out to such an extent that the bathing space or spaces are carried chiefly or solely by the supporting frame or frames and cross bars and thus may be constructed in a very light and simple manner.

A number of constructions embodying the invention are illustrated by way of example in the accompanying drawings, in which

Fig. 25 is a top view of a floating bathing space arranged between and around two—or a larger number if desired—larger vessels, floats with superstructures or the like.

Figures 1, 2:
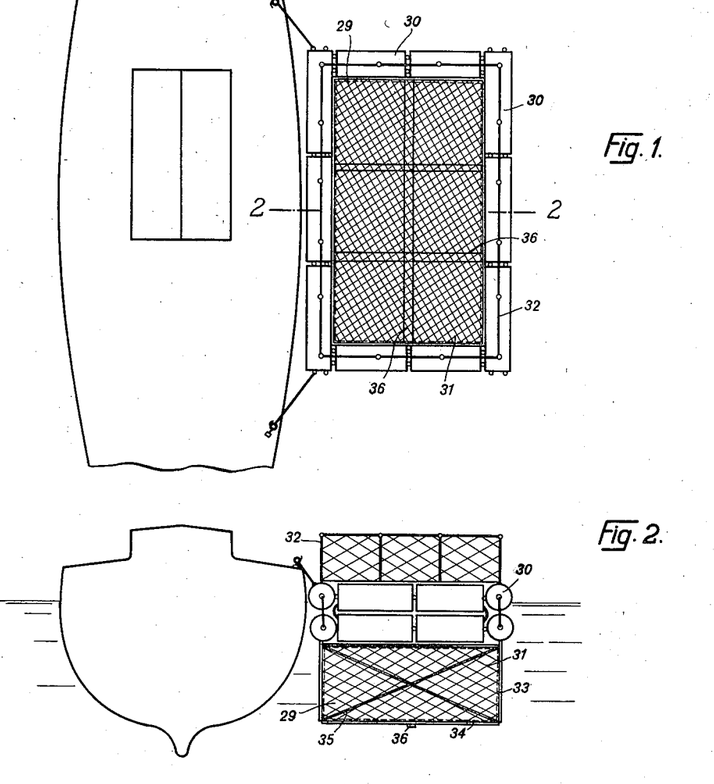
Figure 1 is a top view of a floating bathing space directly connected with a vessel.
Fig. 2 is a cross section on the line 2—2, of Fig. 1.

In the construction shown in Figs. 1 and 2 the floating bodies 30 of the bath container 29 are, for example, arranged in two superposed rows, the connection between the floating bodies 30 themselves and with the side walls of the container 29, which consist of net-work or other suitable rigid or non-rigid material 31, depending on the nature of the material chosen. Above the floating bodies 30 a protective grating 32 is provided. The bath container 29 is given the desired form by means of the struts 33, 34, 35 or other suitable means. The bottom surface of the container 29 may be reinforced also by means of the girths 36.

Figure 3:
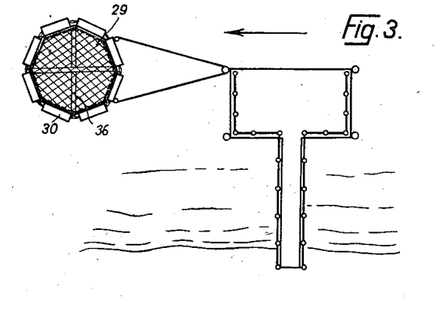
Fig. 3 is a top view of another form of a floating bathing space indirectly connected with a landing place.
Figure 4:
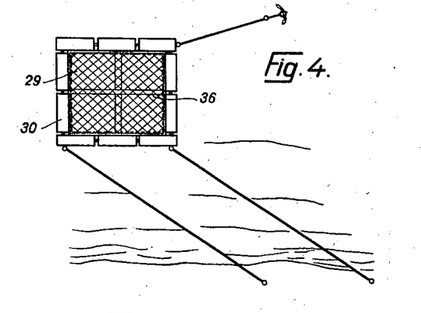
Fig. 4 is a top view of another modification of a floating bathing space indirectly connected with the shore or bank and anchored in the water.
Figure 5:
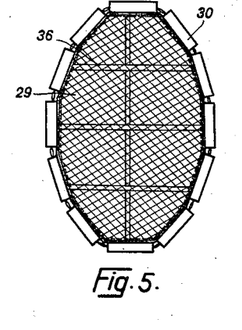
Fig. 5 is a view of freely floating bathing space.

Figs. 3, 4 and 5 illustrate additional types of floating bathing spaces.

Figure 6:
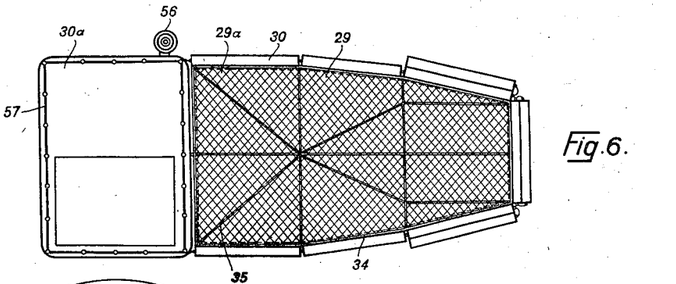
Fig. 6 is a top view of a freely floating bathing space driven forward by an outboard motor and provided with a special resting place.
Figure 7:
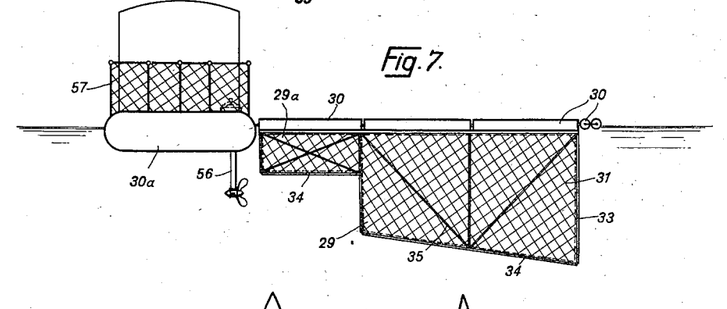
Fig. 7 is a side view of the floating bathing space shown in Fig. 6.

In Figs. 6 and 7 a special kind of floating bathing space is shown which can be moved by an outboard motor, by sails or oars, so that its users are not compelled to employ a boat of the regular type. A floating member 30a composed of one or several pieces is used by the bathers for rest and recreation before and after bathing and may carry a tent or the like as well as chairs, tables and other articles. The outboard motor 56 serves for moving the bath, and the protective gratings 57 may be provided to afford greater security if desired. The bath container proper is provided again with the floating bodies 30 which in the constructions shown are augmented by several floating bodies disposed at the end not facing the resting place. The braces 33, 34, 35 are arranged so that on the side nearer the resting place a flat container for use by children and on the farther side another container which slopes down gradually are provided and thus two independent bath containers 29 and 29a are produced.

The types of floating bathing spaces shown in Figs. 1 to 5 and 13 to 26 have for simplicity's sake a bottom which is equally deep at every point while Figs. 6 to 10 and Fig. 12 illustrate bathing spaces whose bottom slopes down gradually or in steps.

Figure 8:
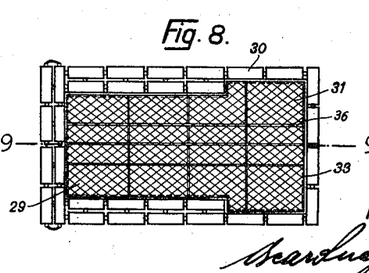
Fig. 8 is a top view of a subdivided floating bathing space having a gradually sloping bottom surface due to the use of additional floating bodies.
Figure 9:
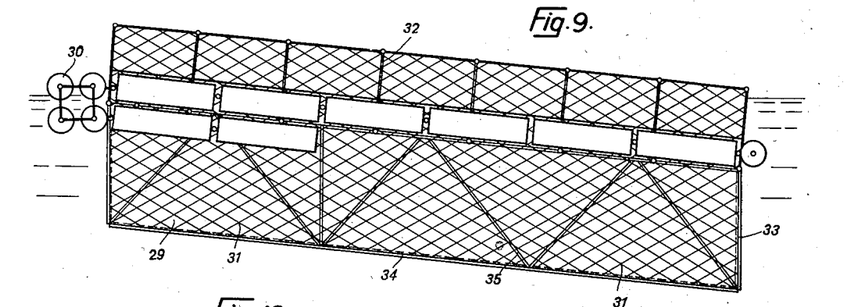
Fig. 9 is a longitudinal section on the line 9—9, of Fig. 8.

According to Figs. 8 and 9, gradual or stepwise sloping is effected by arranging on one front side of the container 30 a larger number of floating bodies 29 than on the opposite side and on the long sides a gradually decreasing number of floating bodies 29 which are disposed behind or below one another.

Figures 10, 11, 12:
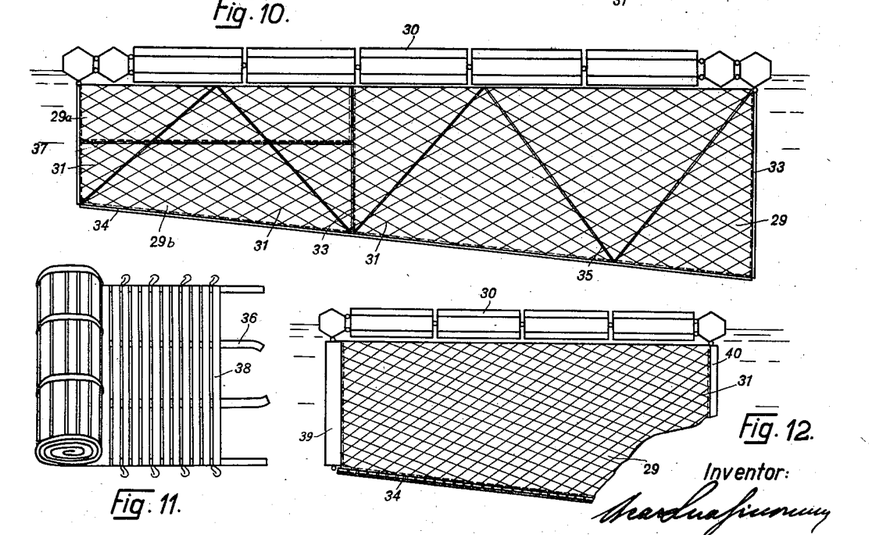
Fig. 10 is a longitudinal section of a floating subdivided and stepped bathing space provided with braces differing in length.
Fig. 11 is a view of a lattice bottom in a floating bathing space.
Fig. 12 is a longitudinal section of a floating bathing space provided with suspended supports differing in elasticity.

Another form of sloping bottom is shown in Fig. 10, in which the bottom is suspended from the struts 33 and 35 differing in length, and the intermediate bottom 37 serves to provide a separate and completely enclosed section 29a which does not in any way obstruct the flow of water and in which children may lie or bathe, the intermediate bottom 37 consisting of the same material as the other bottoms, of laths connected by the girths 36 or similar means or of a suitable material 38. Another form of the sloping or stepped bottom is shown in Figs. 6 and 7 and described already above. Moreover, a smaller bath container 29a independent of the main container and adapted for use by smaller children or non-swimmers may be provided in the bath container 29 and secured thereto or possess independent floating bodies or none at all.

It is furthermore quite easy to arrange the bath container 29 in steps so that from the start only the compartments 29 and 29a are produced and not the compartment 29b. In this way any number of steps may be provided to suit requirements.

In the construction shown in Fig. 12 the depth of the bottom surface can be varied by the suspended supports 39 and 40 differing in elasticity and having the same or a different length, the suspended supports consisting, for instance, of spiral springs, rubber ropes fitted with spiral springs, hollow metal bars with oil dashpots or other suitable suspension or supporting devices which can be extended and are capable of returning more or less slowly to a position of rest. The bottom struts 34 as well as the bottom surface should be stronger in this type of bath.

This construction is adapted especially for people who wish to learn how to swim, for they will always find the bottom of the bath container at the desired distance from their body. A person standing on the bottom of the bath container to rest between swimming periods depresses the bottom by his weight, which, on being released from weight when the person begins to swim again, gradually rises, owing to the elasticity of the suspension supports, and after a while, when the swimmer is tired again, is so close again to the more or less horizontally extended body that the swimmer or learner can touch the bottom and stand thereon without any danger of drowning.

The constructions of floating bathing spaces shown in Figs. 13 to 26 and provided with the supplementary supporting frames 41 or bars 42 are, merely for the sake of simplicity, fitted again with a bottom surface that is parallel to the surface of the water, though these constructions may be equipped with all the devices and parts described as features of the invention as well as with the devices forming part of the invention which will be described below or, interchangeably, with some of the devices described and not yet described.

Figures 13, 14, 15:
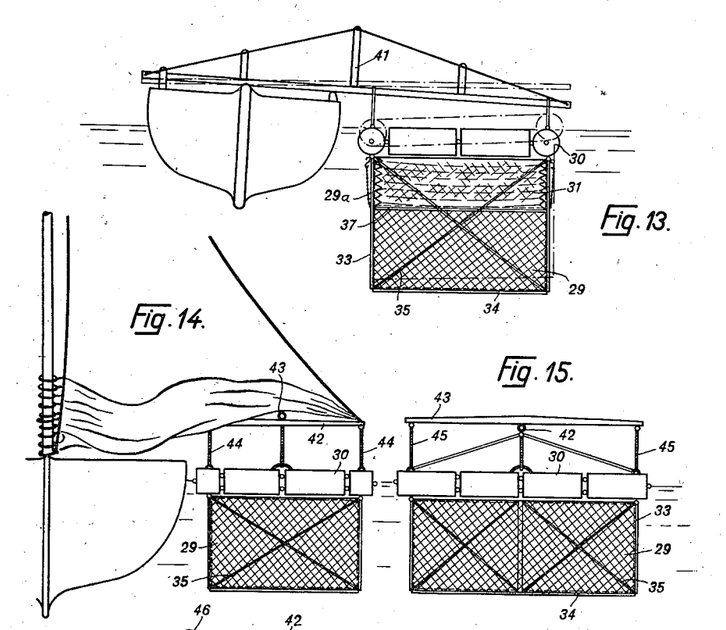
Fig. 13 is a cross section of a floating bathing space attached in a supplementary way to a supporting frame, the dotted lines indicating approximately the position of the bath container when not loaded.
Fig. 14 is a cross section of a floating bathing space attached in a supplementary manner to the cross beam of a sailing vessel.
Fig. 15 is a side view of the floating bathing space shown in Fig. 14 with the supplementary attachment shown in diagram.

The modification shown in Fig. 13 illustrates a bath container suspended in a supplementary manner from a supporting frame 41 in two positions, the manner of constructing the frame 41 and suspending therefrom the bath container being optional and depending on local conditions. In the modification shown, the possibility is indicated, for instance, of raising the net-work or other materials used for forming the bottom surface up to the level of an intermediate bottom 37 if required, so that either the bath container 29 or 29a may be used. When the bottom surface is raised this way, the struts need not necessarily be raised also or detached.

Figs. 14 and 15 illustrate a floating bathing space in which the bath container rests to a not inconsiderable extent, though in a supplementary manner, on the cross beam 42 of a sailing boat, the container being supported also by the longitudinal bar 43 and the auxiliary rigging 44, 45.

Figures 16, 17:
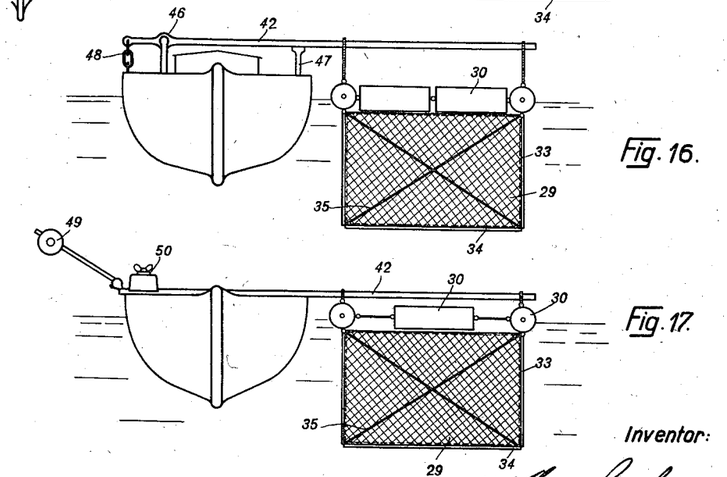
Fig. 16 is a cross section of a floating bathing space supported in a supplementary manner by means of a cross bar upon the deck of a vessel.
Fig. 17 is a cross section of a floating bathing space supported in a supplementary manner by a cross bar provided with sliding weight and folding counterweight.

The floating bathing space shown in Fig. 16 is supplementarily suspended from a cross bar 42 which, for example, may be articulated at 46 and rest on a support 47. A tension member 48 serves for adjusting the cross bar 42. Instead of the means shown other suitable devices may be employed for regulating the bath container.

The floating bathing space illustrated in Fig. 17 requires still fewer floating elements 30 than the constructions described already, as it is relieved and held in its adjusted position by one or several folding counterweights 49 and, if necessary, by one or several sliding weights 50. The means shown may be replaced by other suitable means, such as, for example, hydraulic ones, and the floating support of the bath container, which, in the construction shown, is a boat, may be provided with devices by means of which the center of gravity of the floating support and container may be shifted in one direction or the other.

Figure 18:
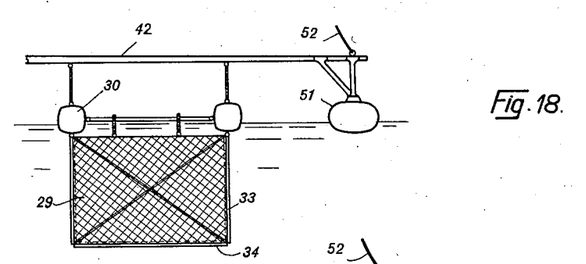
Fig. 18 is a cross section of a floating bathing space which is supplementarily suspended from a cross bar supported by one or several floating bodies and diagonal ties.
Figures 19, 22, 23, 24:
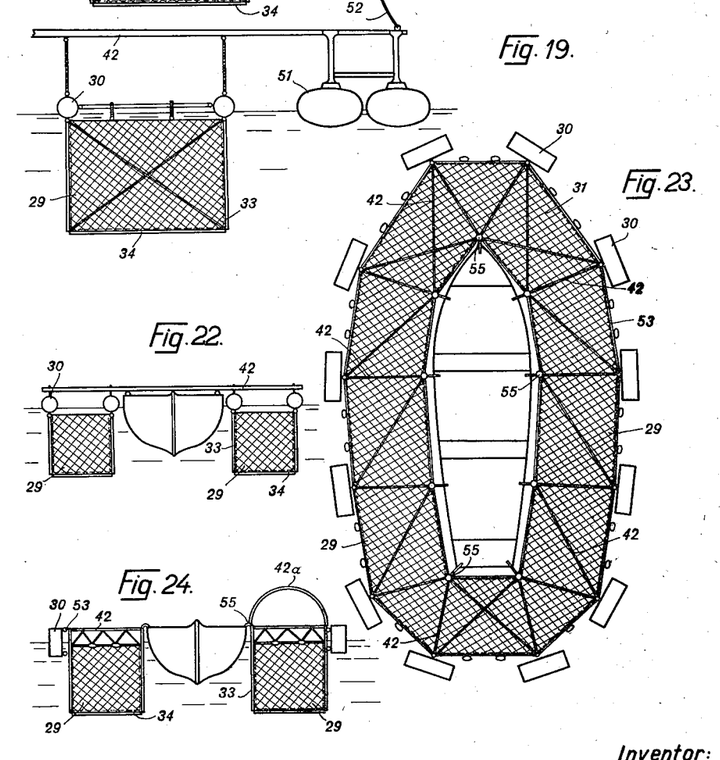
Fig. 19 is a cross section of a floating bathing space supported mainly by one or several floating bodies and diagonal ties of the cross bar.
Fig. 22 is a cross section of two floating bathing spaces supplementarily suspended from a cross bar on either side of a vessel.
Fig. 23 is a top view of a floating bathing space surrounding completely a vessel and supported partly by the vessel and partly by floating bodies.
Fig. 24 is a cross section of the floating bathing space shown in Fig. 23.

Figs. 18 and 19 show floating bathing spaces which are attached also in a supplementary manner to the cross beam of a sailing vessel or a suitable cross bar 42 extending from a fixed or floating point in or near the water. The cross bar 42 may be assisted by the floating members 51 rigidly connected with it, and held by the cords 52 or similar means. When the carrying capacity of the floating elements 51 is increased, that of the floating bodies of the bath container may be reduced more and more or cease entirely.

Figure 20:
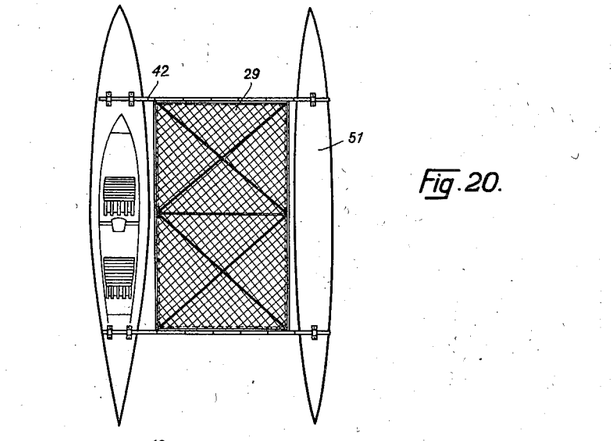
Fig. 20 is a top view of a floating bathing space arranged between a collapsible boat or a kayak or similar vessel and a special outrigger of the latter.
Figure 21:
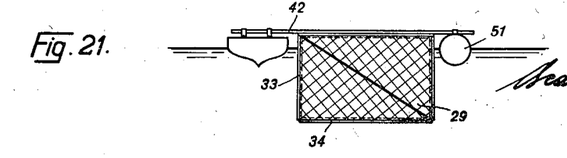
Fig. 21 is a side view of the floating bathing space shown in Fig. 20.

Figs. 20 and 21 illustrate a particularly light construction of a floating bathing space according to the invention, in which the bath container 29 is supported by the cross bars 42 relative to a folding boat, kayak or other type of light row-boat and, on the other hand, to a floating member 51 constructed as outrigger. The cross bars and the outrigger can be made of several parts if necessary which may be taken asunder and telescoped to take up the smallest possible space. This construction is particularly suited for bathing from light vessels which hitherto did not permit of safe bathing for the reason that leaving and re-entering the vessels in perfect safety is out of the question.

Fig. 22 shows a construction, in which two or more floating bathing spaces 29 are arranged on either side of a vessel and supported solely or supplementarily by one or several cross bars 42. In an arrangement of this kind the floating bodies 30 need possess only a very slight carrying capacity, or they may be dispensed with entirely.

In the construction shown in Figs. 23 and 24 a floating bathing space surrounding completely a vessel or a fixed center is supported by the floating bodies 30 and the body of the boat or other starting point. In this construction the connections need not be as rigid as in the constructions described already, it being sufficient to connect the light struts 33 and 34 and the net-work 31 with the outer long bars 53 and the points of junction 55. If necessary, the side walls may be supplementarily provided with the small floating members 54 and the cross bars 42 possess an upwardly bent shape 42a to provide for absolutely free passage in the longitudinal direction of the bath container. If the starting points are of a sufficiently strong type, such as larger steamers, floats, and the like, or if special supporting points are constructed, the floating bodies 30 may be considerably reduced in number or dispensed with entirely.

In that case, the structure carrying and holding the floating bathing space is of correspondingly sturdy construction. The main feature of these types of floating baths is that the persons making use thereof have greater freedom of motion.

Figure 25:
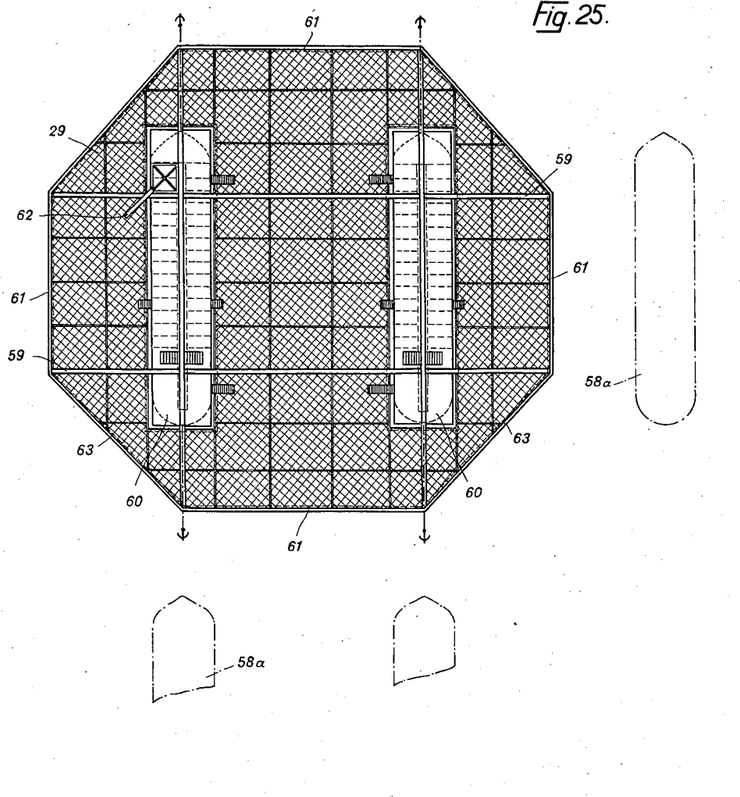
Figure 26:
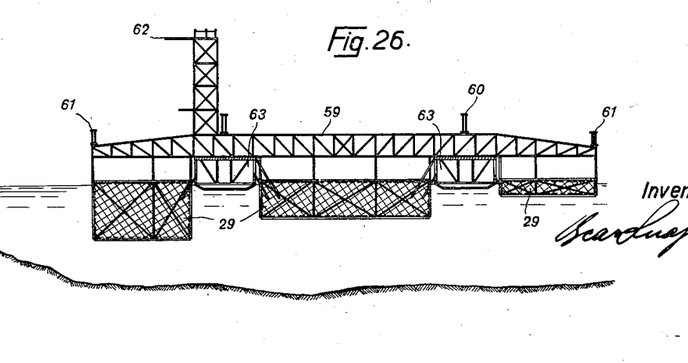
Fig. 26 is a cross section of the floating bathing space shown in Fig. 25.

A large-sized floating bathing space resembling a regular bathing establishment is shown in Figs. 25 and 26, which is supported, by way of example, by the barges 58 which are no longer used for carrying goods. In the modification, two barges are shown and further vessels 58a indicated by dotted lines. The invention makes it possible to arrange any number of such barges side by side and one behind the other and to interconnect them by supporting constructions, such as 59, 60, 61 and the like. Moreover, if disposed at a distance from the shore or bank or along an open air bath, the floating bath may be connected therewith. The bath containers proper may be fitted with floating elements, as in the constructions described, or, as shown in Figs. 25 and 26, used without floating elements which are illustrated here with a horizontal bottom surface and arranged in steps to offer bathing facilities to both swimmers and non-swimmers. The invention permits the construction of floating baths in any desired form so as to be transported to the most sanitary waters if necessary for sports purposes. In the arrangements according to the invention leaping boards 62 may therefore be provided, since the depth of the containers 29 can be varied to suit requirements. At the starting points, which, in the present instance, are the barges 58, the dressing rooms 63 and on the deck or at other suitable points, places for resting and taking a sun bath are provided as are refreshment rooms.

The invention is of course not restricted to the construction shown and described, but the elements according to the invention may be combined into floating bathing spaces of any desired form and for any purpose, which range from the smallest portable forms to types capable of offering bathing and swimming facilities to thousands of people at the same time.

The devices according to the invention make it therefore possible to assemble on the seashore or the bank of a river a bath container and resting place, either wholly or partly, without the aid of a vessel, and to drive them to any part of a free watercourse for the purpose of using them for air and water bathing. Furthermore, an arrangement according to the invention affords an opportunity of learing how to swim without danger by the provision of bath containers on the sides or behind suitable vessels, which are drawn at the requisite speed and which protect their users completely whether they be learners or persons desiring to train. The invention further permits the establishment of an absolutely sanitary and safe bath in lieu of, or in connection with, existing bathing establishments on seashores and river banks, or in the viciinity of sanatoria, hotels, restaurants or other public places located near watercourses or the sea. Or a floating bathing space may be established on the high seas, and even where fishes of prey are found, in connection with an auxiliary vessel moving at suitable speed or with another floating or anchored supporting point.

I claim:—

1. A collapsible floating bathing and swimming device capable of floating independently of rigid points of support, comprising, in combination, flexible and adjustable limiting means permeable to water, adjustable supporting means for imparting rigidity to said limiting means and forming therewith the sides and bottom of a bath enclosure, said supporting means comprising struts variable as to length, and a plurality of floating members surrounding said enclosure, said floating members being capable of variation as to arrangement and number and, in conjunction with said limiting and supporting means, adapted to increase and decrease the capacity of said enclosure.

2. In a device according to claim 1 supporting means for varying the depth of immersion of the bottom limiting means, said supporting means being constructed as elastic bands differing in elasticity.

3. In a device according to claim 1 an intermediate bottom in the bath enclosure.

4. In a device according to claim 1 additional bathing spaces inside the bath enclosure.

5. In a device according to claim 1 fluid-filled floating members varying in carrying capacity according to filling.

6. A collapsible floating bathing and swimming device capable of floating independently of rigid points of support, comprising, in combination, flexible and adjustable limiting means permeable to water, adjustable supporting means for imparting rigidity to said limiting means and forming therewith the sides and bottom of a bath enclosure, said supporting means comprising struts variable as to length, and a plurality of floating members surrounding said enclosure, said floating members capable of variation as to arrangement and number and, in conjunction with said limiting and supporting means, adapted to increase and decrease the capacity of said enclosure, a part of the floating members are constructed as vessels.

7. A collapsible floating bathing and swimming device according to claim 6, comprising means for keeping the limiting and supporting means, in every direction, at a distance from the floating members.

8. A collapsible floating bathing and swimming device according to claim 6, comprising means for keeping the limiting and supporting means, in every direction, at a distance from the floating members, and counterweights for said limiting and supporting means to maintain equilibrium.

9. A collapsible floating bathing and swimming device according to claim 6, in which the vessels acting as floating members are surrounded by the limiting and supporting means.

10. A collapsible floating bathing and swimming device according to claim 6, comprising shelters and recreation rooms on the vessels.

11. A collapsible floating bathing and swimming device capable of floating independently of rigid points of support, comprising, in combination, flexible and adjustable limiting means permeable to water, adjustable supporting means for imparting rigidity to said limiting means and forming therewith the sides and bottom of a bath enclosure, said supporting means comprising struts variable as to length, and vessels acting as floating members, said vessels being capable of variation as to arrangement and number and, in conjunction with said limiting and supporting means, adapted to increase and decrease the capacity of said enclosure.

12. A collapsible floating bathing and swimming device according to claim 11, comprising means for keeping the limiting and supporting means, in every direction, at a distance from the floating members constructed as vessels.

13. A collapsible floating bathing and swimming device according to claim 11, comprising means for keeping the limiting and supporting means, in every direction, at a distance from the floating members, and counterweights for the limiting and supporting means to maintain equilibrium.

14. A collapsible floating bathing and swimming device according to claim 11, in which the vessels acting as floating members are surrounded by the limiting and supporting means.

15. A collapsible floating bathing and swimming device according to claim 11, comprising shelters and recreation rooms on the vessels.

OSCAR SERAFINOWICZ.